July 4, 1944.   J. FRIES, JR   2,352,703
EXPANDER
Filed May 17, 1943
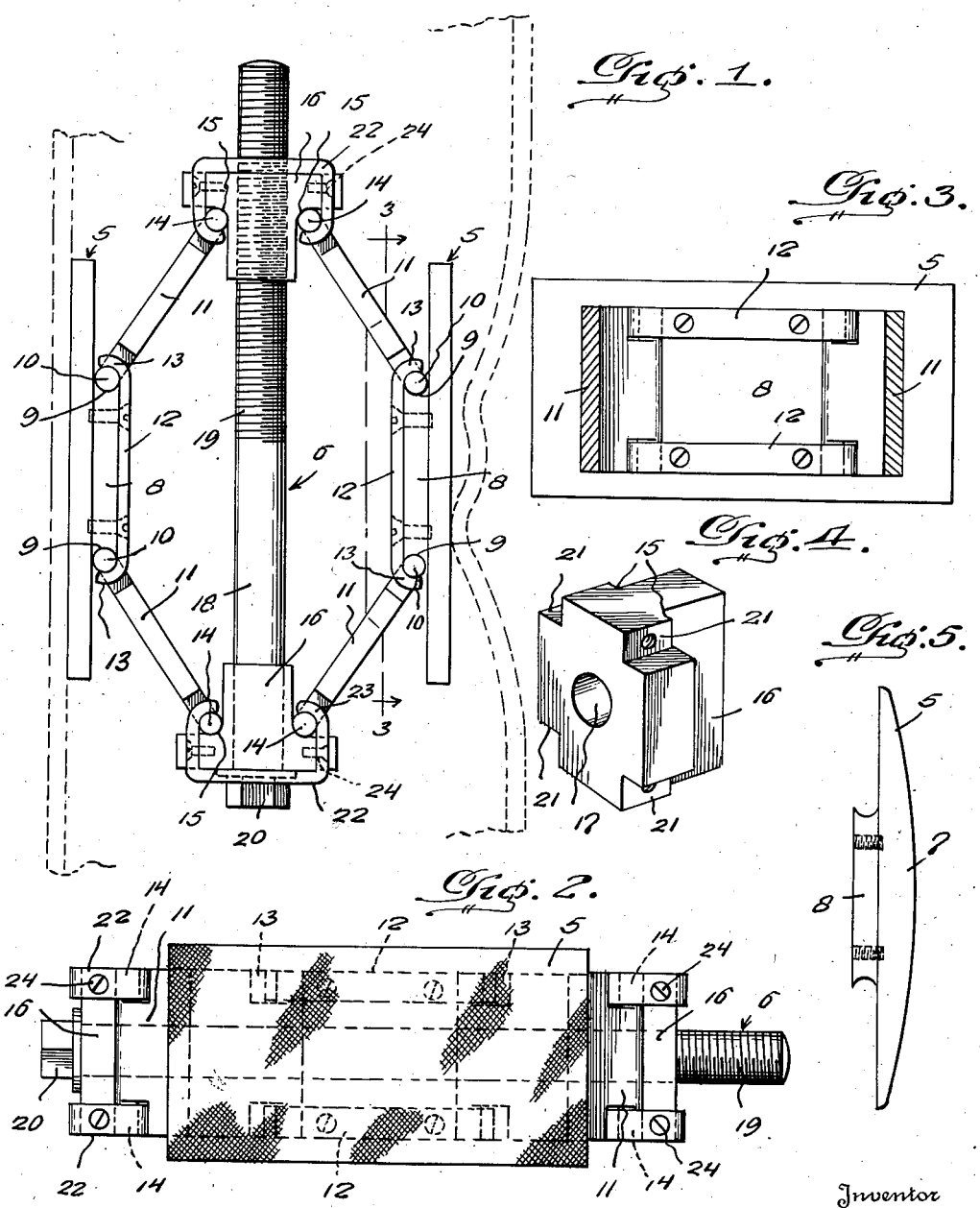
Inventor
Jacob Fries, Jr.,
Attorneys Patented July 4, 1944

2,352,703

UNITED STATES PATENT OFFICE 2,352,703

EXPANDER

Jacob Fries, Jr., Chicago, Ill.

Application May 17, 1943, Serial No. 487,312

1 Claim. (Cl. 153—32)

This invention relates to an expander and more particularly to a hand tool for removing dents, kinks, wrinkles, etc., from motor vehicles, such as the chassis frame, body, or other similar parts of the vehicle.

The primary object of this invention is the provision of a compact, durable and efficient tool of the character stated which may be easily and quickly operated in small spaces as are frequently encountered in chassis frames to press out dents, kinks, or wrinkles of a damaged frame member and which will be capable of withstanding excessive heat employed in the straightening of the damaged frame member.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating an expander constructed in accordance with my invention.

Figure 2 is a plan view illustrating the expander.

Figure 3 is a sectional view taken on the line 3—3 of Figure 1.

Figure 4 is a perspective view illustrating one of the heads or blocks of the operating mechanism.

Figure 5 is an edge elevation illustrating a modified form of my invention.

Referring in detail to the drawing, the numeral 5 indicates opposed pressure plates of substantially rectangular shape and 6 an operating mechanism for moving said plates relative to each other or toward and from one another for the purpose of placing excessive pressure on some selected area of a damaged member as suggested in Figure 1. This member may be a portion of a motor vehicle, chassis frame wherein the member is of channel iron construction and has been subjected to damage by an accident causing one of the flanges of the channel member to buckle or bend presenting therein kinks or bends.

In order that the kinks or bends may be removed, the channel member must be heated and pressure applied to the bends or kinks and in order to do this requires a considerable amount of pressure and by a device which is capable of easy operation within a limited area and which will not be affected by excessive heat.

The present invention, in the form of a hand tool consisting of opposed pressure plates and the operating mechanism 6 can be readily brought between the flanges of the channel member with one of the pressure plates engaging the bent or damaged portion while the other pressure plate engages a portion of said member, so that on operation of the operating mechanism an excessive amount of pressure can be brought to bear on the damaged portion to bring the same into its original condition.

While I have shown and described the invention operating on a particular construction of member, it is to be understood that the invention can be used for straightening other parts which have become damaged of an automobile or similar device. In some instances the damaged part may have a curved surface and if so, the pressure plates may have an arcuate curvature thereto, as shown in Figure 5, that is the outer bearing surface may be convex, as shown at 7 in Figure 5.

Bearing blocks 8 are formed on the opposing faces of the pressure plates 5 and opposite edges thereof are concaved to form seats 9 to be engaged by pintles 10 of connecting links 11. To retain the pintles 10 in the seats 9 strips 12 are removably secured to the bearing blocks 8 and are provided with hook shaped ends 13 engageable with the pintles. This construction will permit the connecting links to hinge relative to the pressure plates. The opposite ends of the connecting links are provided with pintles 14 similar to the pintles 10 engageable in seats 15 formed in blocks or heads 16 of the operating mechanism 6.

Each block or head 16 is of a construction shown in Figure 4 provided with a bore 17 to receive an operating shaft 18, a portion of which is provided with feed threads 19. The bore 17 of one of the blocks or heads 16 is provided with screw threads to mesh with the feed threads 19, the other block or head being loosely journaled on the shaft 18. The shaft 18 is provided with wrench engaging faces 20 so that a suitable tool may be adapted to the shaft for the purpose of rotating the same in either direction.

The heads or blocks 16 have cutaway portions to form seats 21 engaged by substantially U-shaped straps 22, the ends of which are bent into hook formation, as shown at 23, to engage the pintles 14 and cooperate with the seats 15 in hingedly connecting the links to the heads or blocks 16. Fasteners 24 removably secure the straps in place on the seats 21. Thus it will be seen that by the rotation of the shaft 18 in one direction, the pressure plates 5 may be brought in close relation to the shaft so that the entire tool is arranged to have a maximum amount of compactness permitting its easy insertion within small spaces and the rotation of the shaft 18 in an opposite direction will bring about movement of the pressure plates away from each other and when bearing against opposed areas of a member, one area of which has been damaged, will easily bring about a straightening effect of the damaged area. Owing to the construction of the operating mechanism 6 an excessive amount of pressure may be brought to bear on the pressure plates through the expenditure of a minimum amount of power or effort in the rotation of the shaft 18 of the operating mechanism.

The object engaging faces of the pressure plates may be roughened or serrated if desired to assist in preventing said pressure plates from slipping out of position while the tool is in use.

While I have shown and described the preferred embodiment of my invention, it will be understood that minor changes in construction, combination and arrangement of parts may be made without departing from the spirit and scope of the invention as claimed.

Having thus described the invention, what I claim is:

In an expander for the straightening of channeled metallic stock, opposed pressure plates adapted to be arranged against opposed walls of channeled stock, bearing blocks having grooves in ends thereof to provide elongated seats formed on opposing faces of the pressure plates, connecting links having pintles and each link being of plate formation, some of said pintles engaging said seats, elongated straps secured to the bearing blocks and having hook shaped ends extending in the direction of the pressure plates to engage the pintles contacting said seats, an operating rod arranged between the plates, substantially rectangular shaped heads having cutaway portions to provide seats engaged by the other pintles, substantially U shaped straps secured to the heads and having hook shaped ends extending toward the heads to engage the last named pintles to hingedly connect the links to the heads, one of said heads journaled on the rod and slidable relative thereto and the other head threaded to said rod, and means formed on said rod to act as a stop for limiting the sliding of one of said heads on the rod and provided with angularly related exterior faces for a tool to grip to permit rotation of the rod in either direction by the tool.

JACOB FRIES, Jr.